Jan. 29, 1935.  E. H. LAND  1,989,371
METHOD OF MAKING A PRODUCT CONTAINING ORIENTED ASYMMETRIC BODIES
Filed July 29, 1932
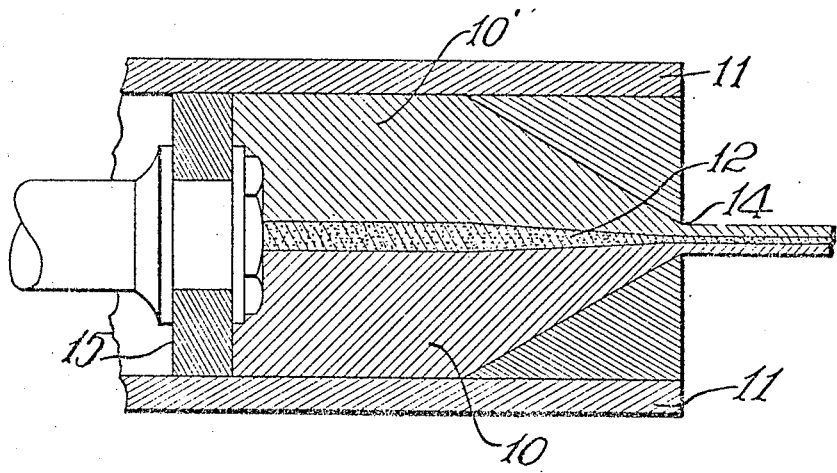
INVENTOR
Edwin Herbert Land
BY Warfield & Brown
ATTORNEYS Patented Jan. 29, 1935

1,989,371

UNITED STATES PATENT OFFICE 1,989,371

METHOD OF MAKING A PRODUCT CONTAINING ORIENTED ASYMMETRIC BODIES

Edwin Herbert Land, Cambridge, Mass., assignor to Sheet Polarizer Company, Inc., Union City, N. J., a corporation of New Jersey Application July 29, 1932, Serial No. 626,250

12 Claims. (Cl. 18—55)

This invention relates to an article of manufacture containing oriented units and a method for producing the same, and more specifically to a light-polarizing product.

In general, it is an object of the invention to provide a method of the character described, which will efficiently accomplish the results desired, which is simple and economical in its requirements of apparatus and material and which can conveniently be executed.

Another object of the invention is to provide a method of orienting units in a medium by the application of a uniform pure stretch and/or without subjecting them to the forces of shear.

Another object is to provide a method for permanently orienting an assemblage of suspended asymmetric colloidal particles.

Another object is to provide an extrusion process for producing a light-polarizing product.

Another object is to provide a light-polarizing product which has a protection coating and the light-polarizing properties of which have not been altered by the application of said coating.

Other objects of the invention will in part be obvious and will in part appear hereinafter.

The invention accordingly comprises the several steps and relation and order of one or more of such steps with respect to each of the others, and the article possessing the features, properties and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawing, which is a cross-section of a device adapted to be used in accordance with the invention.

In the co-pending application of Edwin H. Land, Serial No. 434,833, filed in the United States Patent Office on March 10, 1930, there is described an article of manufacture which polarizes light. It is sometimes desirable to obtain such an article in the form of a sheet and to cause it to adhere to other objects. When an adhesive is applied between the article and the object, there are occasions when, due to the nature of the adhesive and/or to other causes, the arrangement of the polarizing crystals is disturbed and the polarizing property is, to a corresponding degree, lost. The method described below not only orients the crystals, but at the same time imposes a coating so that when the article is attached to an object the adhesive attaches to the coating and does not disturb the crystals.

The polarizing bodies here preferably employed are relatively small crystals which are dichroic and transparent, and can be produced commercially in large quantities with substantial uniformity of size and other properties. It is generally desirable to employ colorless crystals, for example, small crystals of herapathite (sulphate of iodo-quinine).

Herapathite crystals commonly occur in two modifications, generally designated alpha and beta varieties. Care should be taken to use only one variety in the colloidal suspension when prepared for mechanical treatment, as the geometric disposition of the polarizing axes in the two varieties is different. Crystals of herapathite of but one variety, however, result from any standard method of preparation.

The crystals which are preferred, when the orientation is to be accomplished by mechanical means as hereinafter set forth, are relatively small and asymmetric in that they are needle-shaped, preferably having at least one dimension shorter than the wave-length of the light to be used.

A viscous suspension containing such crystals may be made in any convenient manner, preferably that described in my above mentioned co-pending application. One ingredient of this suspension is preferably cellulose nitrate.

The crystals thus dispersed throughout the viscous mass have initially substantially all orientations of their polarizing axes, and form, in the first instance, only an opaque mass.

In general, the method of the invention contemplates embedding a mass of material, prepared as above, between continua of a somewhat similar viscosity which has no polarizing bodies therein and stretching the product. The latter may be the same as the former without the bodies. A preferred form of this process utilizes the apparatus shown in the drawing. A layer 10 having no crystals is placed in a chamber formed by the walls 11, in any suitable fashion. Next to the layer, as shown vertically above, is placed a layer 12, preferably relatively thin, of material containing crystals and against another face of the latter is placed a third layer 10' similar to layer 10. An opening 14 in the end of the chamber has dimensions substantially similar to a cross-section of the layer 12 and is located adjacent that layer. Means are provided for extruding the material through the opening. This may take the form of a piston 15 slidable within the walls 11. The walls 11 may be demountable.

The present method secures orientation of the crystals without the disturbing effect of forces of shear in the case of which the position of uniform orientation of suspended objects is one of unstable equilibrium. The forces of stretch are, however, believed to be utilized in the present method, in which case the position of uniform orientation of suspended objects is one of stable equilibrium.

The material is moved along at varying velocities depending upon the distance from the walls 11 of the chamber. In that layer which extends from the slit 14 centrally through the chamber, however, the variation in velocity is to all intents and purposes zero. If the thin central layer is one-eighth, for example, as deep as the adjacent layers all portions of this central layer will move at substantially the same velocity. The material in this layer will be subjected to a stretch and not to a shear, because a pure stretch may be described as a motion wherein the space rate of change of velocity taken perpendicular to the velocity is a minimum.

The boundaries between the layers may tend to remain intact as the flow takes place.

As the material is extruded, the central layer is subjected to a pure uniform stretch and the crystals orient themselves so that their long axes are in the direction of flow and they act uniformly to polarize light passing through them.

The extruded mass containing the oriented polarizing bodies with the adjacent coatings is allowed to become set, as by drying, so that the resultant body is relatively hard and permanently has the property of polarizing light.

The above described method may be used in a wide variety of instances. It may be desired to orient a multiplicity of magnetized or electrified units in the process contemplated by the invention. Moreover, rolling may take the place of extrusion.

Since certain changes in carrying out the above process, and certain modifications in the article which embody the invention may be made without departing from its scope, it is intended that all matter contained in the above description, or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. The process comprising placing material containing bodies between material containing no such bodies of asymmetric contour, limiting the relative depths of said materials so that as said materials are simultaneously extruded substantially all portions of the material containing said bodies lying on a line perpendicular to the plane of extrusion will be subjected to substantially the same change of velocity during extrusion, and orienting said bodies by extruding said materials simultaneously.

2. The process comprising placing a relatively thin layer of a material containing bodies of asymmetric contour between two relatively thick layers of material substantially free from said bodies, and extruding said layers simultaneously whereby all portions of said first-mentioned layer lying in any line perpendicular to the plane of extrusion, are subjected to a change of velocity, which is substantially the same.

3. The process comprising placing a relatively thin layer of a material containing crystals of herapathite of either the alpha or beta variety but not of each, between two relatively thick layers substantially free from said crystals, and extruding said layers simultaneously, whereby all portions of said first-mentioned layer lying along any line perpendicular to the plane of extrusion, are subjected to a change of velocity, which is substantially the same.

4. The process of orienting an assemblage of particles of asymmetric contour suspended in a medium, comprising simultaneously extruding a layer of said medium containing said particles and two adjacent layers of a medium having substantially no particles therein under such conditions that as said particle-carrying layer is subjected to a change in velocity, all portions of said layer lying in a line perpendicular to the plane of extrusion are subjected to substantially the same change of velocity.

5. The process of orienting an assemblage of particles of asymmetric contour suspended in a medium comprising rolling a layer of said medium containing said particles between two adjacent relatively deep layers of a medium having substantially no particles therein, whereby each of said layers is substantially reduced in thickness and the particles suspended in said first-mentioned layer are caused to align.

6. The process comprising placing a layer of material containing bodies of asymmetric contour between two layers of material substantially free from said bodies, and simultaneously extending all of said layers under such conditions that all parts of said first-mentioned layer lying along a line perpendicular to the plane of extension are subjected to a change in velocity, which is substantially the same, and parts of each of said other layers are subjected to shear.

7. The process of orienting bodies of asymmetric contour which comprises placing a layer of material containing said bodies between two layers of material free from said bodies, and simultaneously extending all of said layers under such conditions that all portions of said first-mentioned layer lying in any line perpendicular to the plane of extension are subjected to substantially the same change in velocity.

8. In the process of orienting particles of asymmetric contour dispersed throughout a suspending medium, the steps which comprise placing said medium between layers of similar material substantially free from said particles, and simultaneously extruding said medium and said layers under such conditions that as said medium is subjected to a velocity change substantially all portions of said medium lying in any line perpendicular to the plane of extrusion are subjected to substantially the same change in velocity, and then setting said stretched materials.

9. In the process of orienting particles of asymmetric contour dispersed throughout a suspending medium, the step which comprises extruding said medium through an orifice under such conditions that as said medium is subjected to a velocity change substantially all portions of said medium lying in any line perpendicular to the plane of extrusion are subjected to substantially the same change in velocity.

10. The process comprising placing a layer of material containing particles of asymmetric contour between two layers of material substantially free from said particles and simultaneously extending all of said layers under such conditions that the thickness of the particle-carrying layer is altered and substantial orientation of the particles secured, all parts of said particle-carrying layer lying along any line perpendicular to the plane of extension being subjected to substantially the same change of velocity.

11. The process comprising placing a layer of material containing particles of asymmetric contour between two layers of material substantially free from said particles and orienting said particles by simultaneously extending all of said layers under such conditions that only the layers free from particles are subjected to shear.

12. In the process of orienting a multiplicity of particles of asymmetric contour suspended in a medium positioned between particle-free continua, the step which comprises simultaneously extending said medium and said continua and effecting a diminution in the thickness of said medium.

EDWIN HERBERT LAND.